United States Patent [19]
Steidl et al.

[11] Patent Number: 5,647,238
[45] Date of Patent: Jul. 15, 1997

[54] METHOD FOR SUPPRESSING THE INFLUENCE OF ROLL ECCENTRICITIES ON A CONTROL FOR A ROLLING-STOCK THICKNESS IN A ROLL STAND

[75] Inventors: Siegbert Steidl, Herzogenaurach; Clemens Jungkunz, Erlangen; Klaus Berger, Höchstadt, all of Germany

[73] Assignee: Siemens Aktiengesellschaft, München, Germany

[21] Appl. No.: 411,119

[22] Filed: Mar. 27, 1995

[30] Foreign Application Priority Data

Mar. 29, 1994 [DE] Germany .................. 44 10 962.8

[51] Int. Cl.⁶ .................................................. B21B 37/00
[52] U.S. Cl. .................................................. 72/10.1; 72/13.4
[58] Field of Search ........................ 72/8.3, 10.1, 10.4, 72/13.4, 14.4, 16.9

[56] References Cited

U.S. PATENT DOCUMENTS

| | | | |
|---|---|---|---|
| 3,889,504 | 6/1975 | Ichiryu | 72/8 |
| 3,920,968 | 11/1975 | Imai et al. | 72/8.3 |
| 3,928,994 | 12/1975 | Ichiryu et al. | 72/8.3 |
| 3,961,509 | 6/1976 | Dohrmann | 72/6 |
| 4,299,104 | 11/1981 | Hayama et al. | 72/20 |
| 4,384,748 | 5/1983 | Naoi et al. | 72/199 |
| 4,521,859 | 6/1985 | Fapiano | 364/472 |
| 4,580,224 | 4/1986 | Gerber | 364/472 |
| 4,685,063 | 8/1987 | Weihrich et al. | 72/16 |
| 4,910,985 | 3/1990 | Ballyns | 72/10.4 |
| 5,077,997 | 1/1992 | Wolters et al. | 72/8 |

FOREIGN PATENT DOCUMENTS

| | | |
|---|---|---|
| 0 252 731 | 1/1988 | European Pat. Off. . |
| 0 170 016 | 12/1988 | European Pat. Off. . |
| 0 424 709 | 5/1991 | European Pat. Off. . |
| 1 234 835 | 2/1967 | Germany . |
| 24 40 166 | 3/1975 | Germany . |
| 26 43 686 | 7/1979 | Germany . |
| 26 43 686 | 3/1980 | Germany . |
| 42 31 615 | 3/1994 | Germany . |
| 1 580 066 | 11/1980 | United Kingdom . |

OTHER PUBLICATIONS

Stahl U. Eisen, vol. 95, No. 23 (1975); 6 Nov. 1975; pp. 1125–1130; Kurt Hertlein, Berlin, DE: *Walzen von Band mit besonders geringen Dickenabweichungen*.

Primary Examiner—Lowell A. Larson
Assistant Examiner—Rodney A. Butler
Attorney, Agent, or Firm—Kenyon & Kenyon

[57] ABSTRACT

To suppress the influence of roll eccentricities on a feedback control of a rolling-stock thickness in the thickness control, it is generally known to provide an insensitive dead zone for signal fluctuations caused by the roll eccentricities, and for the zone width of this insensitive dead zone to be varied relative to the magnitude of the signal fluctuations. To prevent actual thickness fluctuation in the rolling stock from leading to a widening of the dead zone, it is provided for the signal fluctuations drawn upon to vary the zone width (x) to be filtered by one or more band-pass filters (26, 27), whose mid-frequencies correspond to the fundamental frequency ($\omega$) and, in some instances, to the first or further harmonic component frequencies ($2\omega$) of the roll eccentricities ($\Delta R$).

11 Claims, 3 Drawing Sheets

METHOD FOR SUPPRESSING THE INFLUENCE OF ROLL ECCENTRICITIES ON A CONTROL FOR A ROLLING-STOCK THICKNESS IN A ROLL STAND

BACKGROUND OF THE INVENTION

The present invention relates to a method for suppressing the influence of roll eccentricities on a feedback control for a rolling-stock thickness in a roll stand, an insensitive or non-responsive dead zone being provided in the thickness control for signal fluctuations caused by the roll eccentricities, and the zone width of this insensitive dead zone being varied relative to the magnitude of the signal fluctuations.

In controlling the thickness of the rolling stock in a roll stand, one encounters the difficulty that the thickness of the rolling stock cannot be easily measured as a controlled variable of interest that is able to be evaluated using control engineering methods at the location where it originates, namely the roll nip and, therefore, cannot be drawn upon to immediately correct disturbances, such as roll eccentricities. However, in accordance with the so-called gauge-meter principle, the thickness $h_a$ of the rolling stock as it emerges from the roll nip can be determined arithmetically from the setting position s of the rolls, the roll separating force $F_W$ and the spring constants $c_G$ of the roll stand as $$h_a + \Delta R = s + F_W/c_G$$

In the case of the so-called AGC (automatic gauge control) method, proceeding from this relation the roll separating force is detected by means of a roll-load detector and is drawn upon to control the thickness of the rolling stock. If the roll nip becomes larger, for example because of an increase in the feed thickness of the rolling stock, this leads to an increase in the roll separating force; this increase is detected, the setting position s of the rolls being reduced by means of the control, so that the roll separating force $F_W$ is increased further and the thickness of the rolling stock is again readjusted to its setpoint value. However, as equation (1) shows, the rolling-stock thickness $h_a$ is not available by itself, but rather only together with the roll eccentricity $\Delta R$, which causes a periodic increase and decrease in the roll separating force $F_W$ during the rolling process. However, the increase and decrease in the roll separating force $F_W$ caused by the eccentricities are mistakenly interpreted by the AGC system as an increase or decrease in the roll nip, through which means the roll separating force $F_W$ is automatically increased or reduced by way of the setting position s, and the eccentricities are consequently rolled in their entirety into the rolling stock. To prevent this negative effect that the roll eccentricities have on the feedback control of the rolling-stock thickness, the German Patent 26 43 686 discloses providing a dead zone in the control that is insensitive to the signal fluctuations produced by the roll eccentricities. In this case, the width of the dead zone is varied in dependence upon the amplitudes of the signal fluctuations and is thus adapted to the extent of the eccentricities.

The German Patent Application P 42 31 615.4 proposes varying the zone width in dependence upon an ongoing statistical evaluation of the signal fluctuations, their standard deviation preferably being determined.

In these proposed solutions, since all the signal fluctuations are interpreted as instances of eccentricity, actual fluctuations in the thickness of the rolling stock lead to an increase in the dead-zone width and, thus, to a slower correction of the thickness error.

The invention improves upon the prior art by optimizing the adaptation of the dead-zone width in dependence upon the occurring eccentricies.

SUMMARY OF THE INVENTION

The present invention achieves this improvement in that, in the case of the method of the type indicated at the outset, the signal fluctuations drawn upon to vary the zone width are filtered by a band-pass filter, whose mid-frequency corresponds to the fundamental frequency of the roll eccentricities. Through the frequency-selective control of the dead-zone width, it is ensured that only signal fluctuations having the eccentricity frequency are able to enlarge the width of the dead zone. If no signal components of this frequency exist, then the dead zone remains inactive. As a consequence specially remaining thickness errors can be avoided.

The frequency spectrum of the eccentricities essentially contains the fundamental frequencies of the roll-stand rolls afflicted by eccentricity, as a rule, these being the backing rolls. However, higher harmonic components also exist, but often only appear with reduced amplitudes. If the aim is also to suppress the influence of the harmonic components of the roll eccentricities on the feedback control of the rolling-stock thickness, it is then provided within the scope of the invention for the signal fluctuations to be filtered by at least one additional band-pass filter, whose mid-frequency corresponds to the first or further harmonic component frequency of the roll eccentricity, and for the composite signal of the band-pass filters to be drawn upon to vary the dead-zone width.

The fundamental frequency and the harmonic component frequencies are determined from the rotational speed of the rolls afflicted by eccentricity. For example, when the rotational speed is measured at the driven working rolls, while the eccentricities are caused by the backing rolls, then the measured rotational speed of the working rolls is converted as a function of the ratio of the diameter of the working rolls to that of the backing rolls into the rotational speed of the backing rolls afflicted by eccentricity.

The dead-zone width is preferably varied in dependence upon an ongoing statistical evaluation of the band-pass-filtered signal fluctuations. The present invention thus takes into account the fact that the influence of the roll eccentricities on the control of the rolling-stock thickness and, thus, the corresponding signal fluctuations, as a rule, are not easily predictable quantities, so that they are advantageously detected and evaluated for the control by means of the statistical signal evaluation.

The statistical evaluation preferably consists in determining the standard deviation of the band-pass-filtered signal fluctuations, by which means a quantity that optimally reproduces the current extent of the eccentricity-dependent signal fluctuations is determined to adjust the dead zone. In so doing, the values continually determined for the standard deviation are weighted with a predetermined factor in the order of magnitude of more or less 1 to 4, preferably 1.5.

The European Patent 0 170 016 discloses a method for suppressing the influence of roll eccentricities on the control of the rolling-stock thickness, in the case of which the fundamental component and, in some instances, selected harmonic components of the roll eccentricities are simulated by the output signal of a feedback oscillator or the composite output signal from a plurality of feedback oscillators, and the output or composite output signal is applied to the thickness control. If such an eccentricity-compensation method is provided in conjunction with the eccentricity-dependent dead-zone control, it is then provided within the scope of the invention for the composite signal of the band-pass filters drawn upon to vary the dead-zone width to contain at least one further harmonic component than the output or composite output signal produced by the at least one oscillator. The eccentricity compensation by means of the feedback oscillator has the result that the signal fluctuations caused by eccentricity and remaining in the control still contain only harmonic components, which are not simulated by the at least one oscillator. The remaining harmonic components drawn upon to control the dead-zone width lead to a reduction in the dead-zone width, however without this dead-zone width being entirely reduced to zero. By this means, a better modulation of the thickness control is achieved, especially in the small signal behavior caused by such signal components which are not produced by eccentricity.

Furthermore, to suppress the influence of the roll eccentricities on the control of the rolling-stock thickness, the signal fluctuations band-pass filtered with the mid-frequency of the fundamental component and, in some instances, with the mid-frequencies of harmonic components can also be applied to the thickness control, the composite signal of the band-pass filters being drawn upon to vary the dead-zone width containing at least one further harmonic component than the band-pass-filtered signal fluctuations applied to the thickness control. The latter is necessary since, otherwise, assuming an ideal compensation both of the fundamental as well as of all harmonic components of the roll eccentricities, the dead-zone width would be entirely reduced to zero and, consequently, existing higher harmonic components could undesirably stimulate the thickness control.

BRIEF DESCRIPTION OF THE DRAWINGS

To clarify the present invention, reference is made in the following to the drawing figures in which.

DETAILED DESCRIPTION

Figure 1:
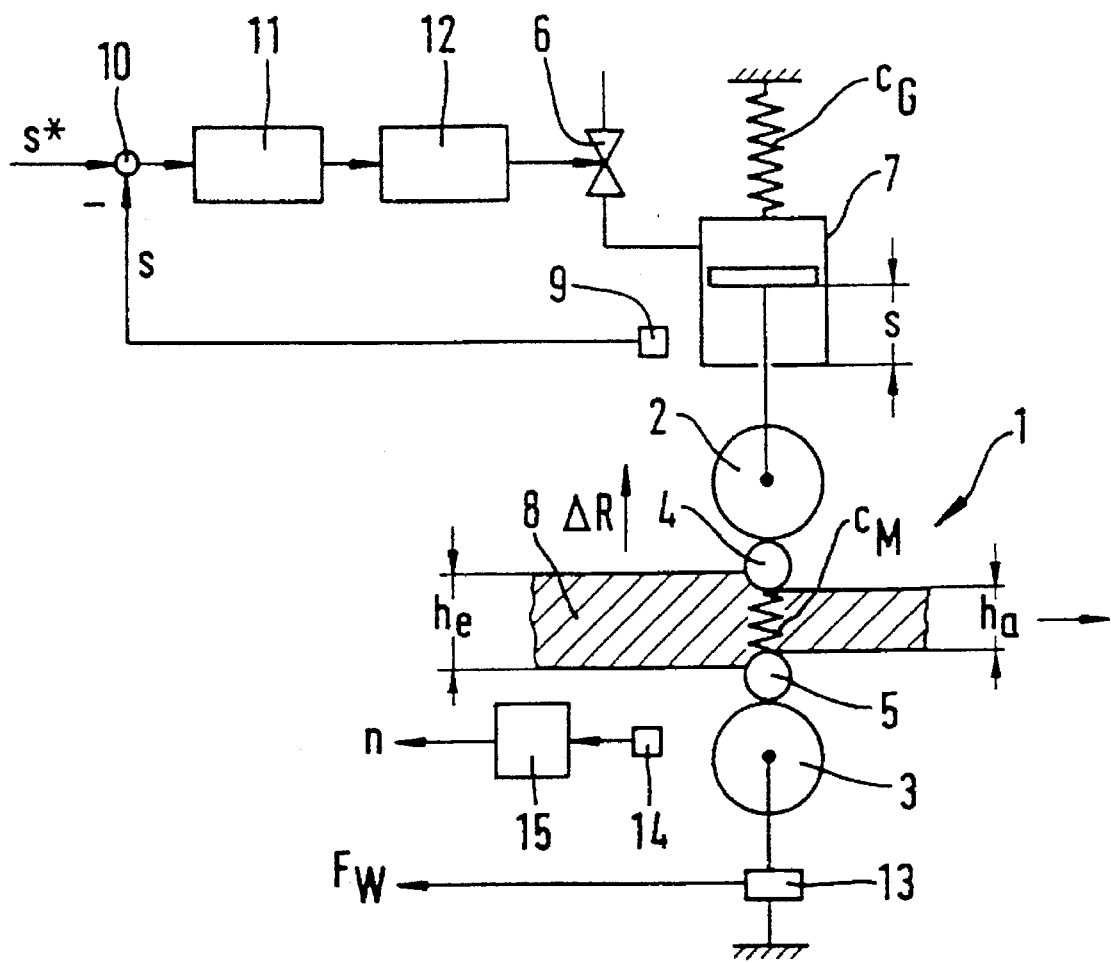
FIG. 1 shows an example for controlling the position of a roll stand.

An example is depicted in FIG. 1 for controlling the position of a roll stand 1 having an upper and lower backing roll 2 or 3, two working rolls 4 and 5, a hydraulic screw-down gear 7 actuated by a control valve 6 for adjusting the roll-setting position s, and a spring $c_G$ symbolizing the elasticity of the roll stand 1. The rolling stock 8, which can have an equivalent material spring $c_M$ allocated to it in the roll nip, is rolled down by the two working rolls 4 and 5 from a feed or incoming thickness $h_e$ to an outgoing thickness $h_a$. The roll eccentricities can be described by an effected change in the roll radius $\Delta R$. The setting position s is measured by means of a position sensor 9 on the screw-down gear 7 and compared as an actual value at a summing point 10 to a setpoint value s* of the roll setting position, the result of the comparison being drawn upon by way of a position controller 11 and a downstream actuating drive 12 for actuating the control valve 6 and, thus, for adjusting the setting position s. The roll separating force $F_W$ is measured by means of a pressure sensor 13 on the roll stand 1. As will be clarified further below, to compensate for the roll eccentricities $\Delta R$, it is necessary to measure the rotational speed of the rolls afflicted by eccentricity. Assuming in simplified terms that the upper and lower rolls of the roll stand 1 are turning at the same speed, it suffices to simply detect the rotational speed of one driven roll, for example of the working roll 5, using an r.p.m. counter 14. If in this case, as in most cases, the backing rolls 2 and 3 are those rolls which are afflicted by eccentricity, then the measured rotational speed of the working roll 5 is converted in a unit 15 as a function of the ratio of the diameter of the working roll 5 to that of the backing roll 3 into the rotational speed n of the lower backing roll 3.

Figure 2:
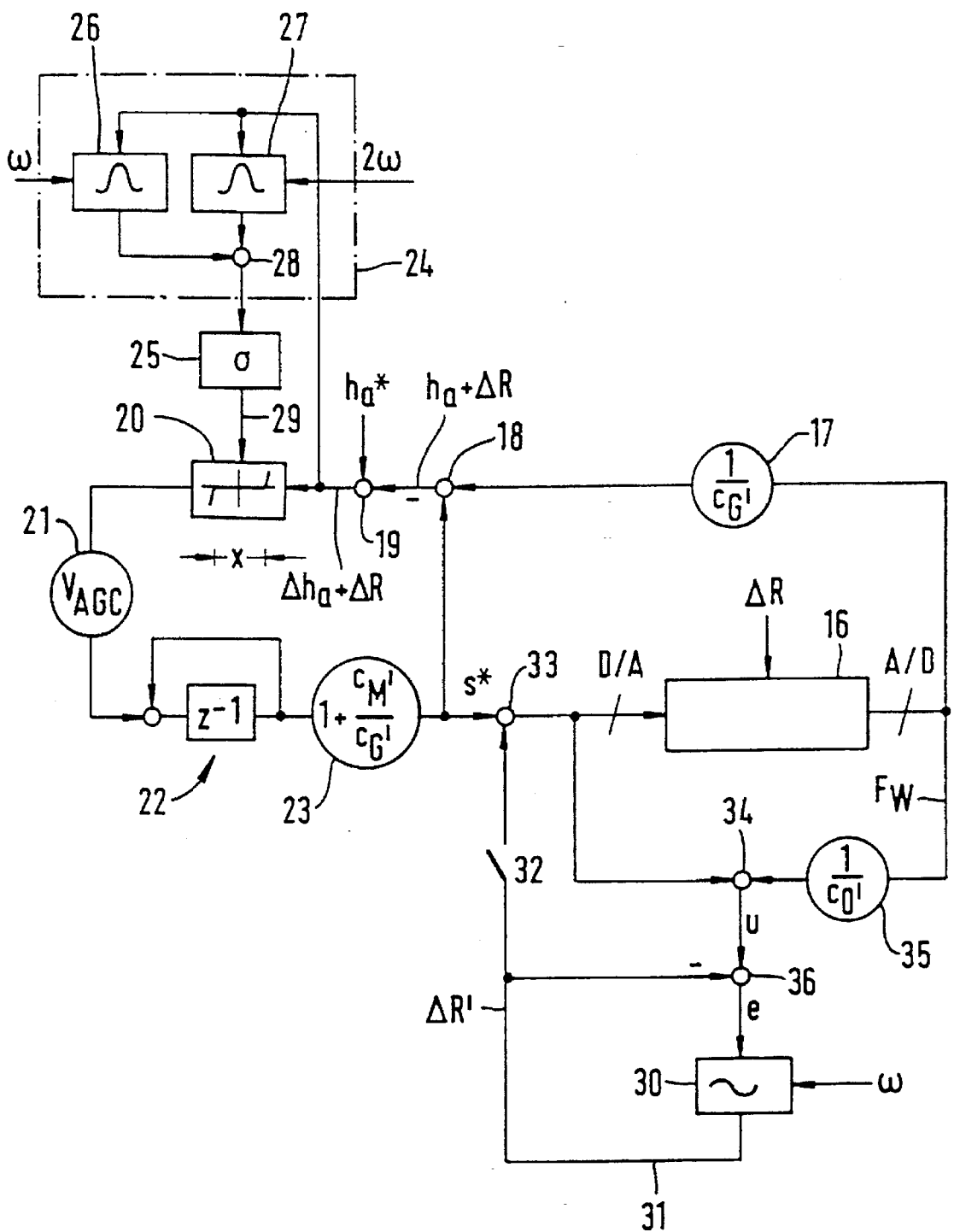
FIG. 2 shows an example for a direct digital control of the rolling-stock thickness with a controllable dead zone, as well as with an eccentricity compensator that works according to the observer principle to suppress the influence of roll eccentricities.

FIG. 2 illustrates an example of a direct digital feedback control of the rolling-stock thickness in accordance with the AGC (automatic gain control) method. 16 denotes the controlled system comprised of the positional control depicted in FIG. 1 and of the roll stand, which is supplied on the input side via a digital-analog converter with the setpoint value s* for the roll setting. As an output signal, the controlled system 16 supplies the roll separating force $F_W$ influenced by the roll eccentricities $\Delta R$, which force is measured and is converted by an analog-digital converter into a digital value. Starting from the equation (1) indicated above for the roll separating force $F_W$, in the case of the thickness control, the measured roll separating force $F_W$ is multiplied in a multiplier element 17 by the reciprocal value of the calculated roll stand spring constants $1/c_G'$ and subsequently added in a summing element 18 with the setpoint value s* of the roll setting to form a composite signal from the calculated actual value $h_a$ of the outgoing thickness of the rolling stock 8 and of the roll eccentricity $\Delta R$. The thus obtained composite signal $h_a+\Delta R$ is compared in a subsequent summing element 19 to the setpoint value $h_a^*$ of the rolling-stock thickness. Thus, the differential signal at the output of the summing point 19 contains not only the difference $\Delta h_a$ between the setpoint value $h_a^*$ and the actual value $h_a$ of the rolling-stock thickness, but also signal fluctuations caused by the eccentricities $\Delta R$. To suppress these eccentricity-induced signal fluctuations $\Delta R$ within the thickness control, the differential signal at the output of the summing point 19 is supplied to a transfer element 20 having a variable dead zone x, which only transfers signal amplitudes lying outside of the dead zone x. As will be clarified in greater detail below, the width of the dead zone x is adjusted to allow it to suppress the signal fluctuations caused by the roll eccentricities $\Delta R$. The output signal from the transfer element 20 that is free of the eccentricity-induced signal fluctuations $\Delta R$ is fed to a roll-nip controller comprised of an amplification element 21 and a digital integrator 22. A correction-amplification element 23, which multiplies the output signal from the roll-nip controller 21, 22 by the factor $1+c_M/c_G'$, is arranged downstream from the roll-nip controller 21, 22 to compensate in this manner for the influence of the system gain of the feedback control circuit with $h_a/s=c_G/(c_M+c_G)$ and, on the output side, makes available the setpoint value s* of the roll-setting position for the controlled system 16.

To be able to adapt the width of the dead zone x produced by the transfer element 20 to the specific amplitude of the roll eccentricities $\Delta R$, the differential signal $\Delta h_a+\Delta R$ at the output of the summing point 19 is fed via a band-pass filter arrangement 24 to a device 25 for statistically evaluating the band-pass filtered signal fluctuations. The band-pass filter arrangement 24 contains a first band-pass filter 26, whose mid-frequency is adjusted in dependence upon the measured rotational speed n of the eccentricity-afflicted rolls to the frequency ω of the fundamental component of the roll eccentricities ΔR with ω=2πn. Moreover, the band-pass filter arrangement 24 contains still another band-pass filter 27, whose mid-frequency is adjusted with 2ω to the frequency of the first harmonic component of the roll eccentricities ΔR. In a summing point 28, the output signals from the two band-pass filters 26 and 27 are summed up, before they arrive at the device 25 for statistically evaluating the band-pass filtered signal fluctuations. In the device 25, the standard deviation of the band-pass-filtered signal fluctuations is determined and multiplied by a predetermined factor of, for example, 1.5, before it is supplied to a control input 29 of the transfer element 20 for adjusting the dead-zone width x. The band-pass filtering controlled by the rotational speed n of the eccentricity-afflicted rolls of the signal fluctuations drawn upon for adjusting the dead-zone width x prevents the entire fluctuation of the differential signal from being interpreted at the output of the summing point 19 as eccentricity, which would lead in the case of actual thickness fluctuations to an increase in the dead-zone width x and, thus, to a slower correction of the thickness error.

In the exemplary embodiment depicted in FIG. 2 of a thickness control, a disturbance observer in the form of a feedback oscillator 30 is additionally provided, which in the steady-state condition simulates the fundamental component of the roll eccentricities ΔR at its output 31, the simulated disturbance ΔR' being applied by way of a switch 32 and a summing element 33 to the setpoint value s* of the roll-setting position at the input of the controlled system 16. The frequency ω of the oscillator 22 is adjusted in this case in dependence upon the measured roll rotational speed n with ω=2πn. At a summing point 34, the setpoint value of the roll setting s*+ΔR', which is superimposed by the simulated roll eccentricity, and the measured roll separating force $F_W$, which is multiplied in a multiplier element 35 by the calculated reciprocal value $1/c_0'=1/c_M'+1/c_G'$ of the total stiffness of the roll stand and material spring, are gated to form a composite signal u. This composite signal u and the output signal ΔR' from the oscillator 30 are compared with one another at a further summing point 36, a correction signal e=u−ΔR' being generated, by means of which the oscillator 30 is corrected in amplitude and phase for so long until the simulated disturbance ΔR' and the composite signal u conform and the error e thus becomes zero. In place of the setpoint value s*, which is superimposed by the disturbance simulation ΔR', the actual value s of the roll setting can also be supplied to the summing point 34; however, in the case of the example shown in FIG. 2, because of the use of the setpoint value s*, the influence of the dynamic response of the position control in the controlled system 16 has no effect on the compensation of the roll eccentricities ΔR, so that its fundamental component is asymptotically completely eliminated in its effect on the roll separating force $F_W$. Since the fundamental component of the roll eccentricity ΔR is no longer present in the thickness control, the control of the dead-zone width x of the transfer element 20 essentially still takes place only in dependence upon the first harmonic component of the roll eccentricities ΔR filtered out by the band-pass filter 27. Since, as a rule, this vibrational component is smaller than the compensated fundamental component, the dead-zone width x is reduced when the disturbance observer comprising the oscillator 30 is switched on, which leads to a better modulation of the thickness control, in particular in the small-signal behavior caused by such signal components, which are not conditional upon eccentricity.

Figure 3:
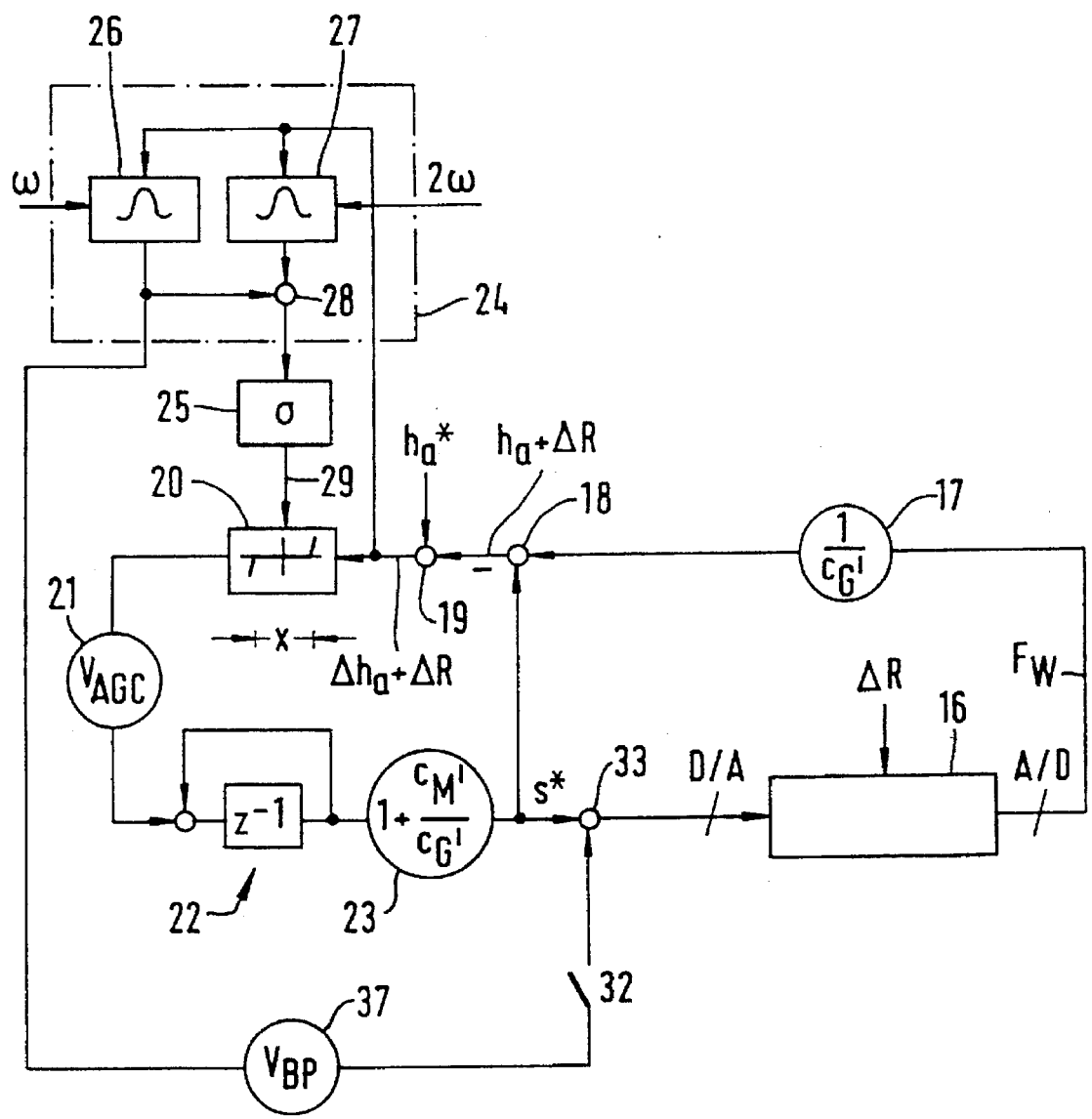
FIG. 3 also illustrates a thickness control comprising a controllable dead zone and another variant for an eccentricity compensator.

The thickness control shown in FIG. 3 differs from the exemplary embodiment according to FIG. 2 in that the disturbance observer comprising the oscillator 30 is missing and, instead, the output signal from the band-pass filter 26, whose mid-frequency corresponds to the fundamental frequency of the roll eccentricities ΔR, is applied via an amplification element 37 and the switch 32 at the summing point 33 to the setpoint value s* of the roll-setting position. Thus, merely the fundamental component is applied in a compensating manner and not the first harmonic component as well, since otherwise, assuming an ideal compensation of both the fundamental as well as of the harmonic component, the dead-zone width x would be completely reduced to zero and higher harmonic components could, consequently, undesirably stimulate the thickness control.

What is claimed is:

1. A method for suppressing the influence of roll eccentricities on a feedback control for a rolling-stock thickness in a roll stand comprising the steps of:

providing a controller for controlling the rolling-stock thickness in the roll stand:

providing measurement signals to a band-pass filter;

generating filtered signals using the band-pass filter; and providing the filtered and measurement signals to an insensitive dead zone having a zone width in the thickness control accounting for signal fluctuations caused by the roll eccentricities, the signal fluctuations being filtered with a band-pass filter for controlling the zone width as a function of the filtered signals, the band-pass filter having a mid-frequency which corresponds to a fundamental frequency of the roll eccentricities.

2. The method of to claim 1, further comprising the step of filtering said signal fluctuations with at least one additional band-pass filter, whose mid-frequency corresponds to at least one of first and further harmonic component frequencies of the roll eccentricity, and using a composite signal of said band-pass filter and said at least one additional band pass filter to vary the dead-zone width.

3. The method of claim 1, wherein said zone width is varied in dependence upon an ongoing statistical evaluation of the band-pass-filtered signal fluctuations.

4. The method of claim 2, wherein said fundamental frequency or the harmonic component frequencies are determined from a measured rotational speed of the rolls afflicted by eccentricity.

5. The method of claim 2, wherein said zone width is varied in dependence upon an ongoing statistical evaluation of the band-pass-filtered signal fluctuations.

6. The method according of claim 2 further comprising the steps of:

simulating the selected harmonic components of the roll eccentricities as at least one of the output signal of a feedback oscillator and the composite output signal from a plurality of feedback oscillators, which output signal is applied to the thickness control, and wherein the composite signal of the band-pass filters drawn upon to vary the dead-zone width contains at least one further harmonic component than the output or composite output signal produced by the at least one oscillator.

7. The method of claim 2 wherein said signal fluctuations band-pass filtered with the mid-frequency of the fundamental component are applied to the thickness control; the composite signal of the band-pass filters being drawn upon to vary the dead-zone width containing at least one further harmonic component than the band-pass-filtered signal fluctuations applied to the thickness control.

8. The method of claim 2 wherein the signal fluctuations are band-pass filtered with the mid-frequencies of harmonic components.

9. The method of claim 3, wherein the statistical evaluation consists in determining a standard deviation of the band-pass-filtered signal fluctuations.

10. The method of claim 5, wherein the statistical evaluation consists in determining a standard deviation of the band-pass-filtered signal fluctuations.

11. A method for suppressing the influence of roll eccentricities on a feedback control for a rolling-stock thickness in a roll stand comprising the steps of:

providing measurement signals to a band-pass filter, the band-pass filter having a mid-frequency corresponding to a fundamental frequency of the roll eccentricities and generating filtered signals;

providing the measurement and filtered signals to a dead zone having a variable zone width, the dead zone suppressing signal fluctuations caused by the roll eccentricities and generating dead-zone output signals, wherein the zone width is varied as a function of the filtered signals provided by the band-pass filter; and feeding the dead-zone output signals to a controller for controlling the rolling-stock thickness in the roll stand.

* * * * *